(12) United States Patent
Deng et al.

(10) Patent No.: US 7,158,395 B2
(45) Date of Patent: Jan. 2, 2007

(54) METHOD AND APPARATUS FOR TRACKING MAXIMUM POWER POINT FOR INVERTERS, FOR EXAMPLE, IN PHOTOVOLTAIC APPLICATIONS

(75) Inventors: Duo Deng, Canton, MI (US); Anil Tuladhar, Dearborn Heights, MI (US); Kenneth J. Farkas, Brighton, MI (US); Kerry E. Grand, Chesterfield, MI (US)

(73) Assignee: Ballard Power Systems Corporation, Dearborn, MI (US)

( * ) Notice: Subject to any disclaimer, the term of this patent is extended or adjusted under 35 U.S.C. 154(b) by 140 days.

(21) Appl. No.: 10/836,631

(22) Filed: Apr. 30, 2004

(65) Prior Publication Data
US 2005/0002214 A1     Jan. 6, 2005

Related U.S. Application Data

(60) Provisional application No. 60/467,332, filed on May 2, 2003, provisional application No. 60/470,321, filed on May 12, 2003.

(51) Int. Cl.
H02M 7/44 (2006.01)
(52) U.S. Cl. ....................................... 363/95
(58) Field of Classification Search ............. 363/95, 363/97, 98, 131, 132
See application file for complete search history.

(56) References Cited

U.S. PATENT DOCUMENTS

| | | | |
|---|---|---|---|
| 4,661,897 A | 4/1987 | Pitel | 363/17 |
| 4,674,024 A | 6/1987 | Paice et al. | 363/71 |
| 5,184,291 A | 2/1993 | Crowe et al. | 363/37 |
| 5,268,832 A | 12/1993 | Kandatsu | 363/95 |
| 5,422,440 A | 6/1995 | Palma | 174/133 B |
| 5,459,356 A | 10/1995 | Schulze et al. | 257/773 |
| 5,508,560 A | 4/1996 | Koehler et al. | 257/730 |
| 5,869,956 A | 2/1999 | Nagao et al. | 323/299 |
| 5,923,158 A * | 7/1999 | Kurokami et al. | 323/299 |
| 6,072,707 A | 6/2000 | Hochgraf | 363/71 |
| 6,078,173 A | 6/2000 | Kumar et al. | 324/158.1 |
| 6,212,087 B1 | 4/2001 | Grant et al. | 363/144 |
| 6,239,997 B1 * | 5/2001 | Deng | 363/95 |
| 6,339,538 B1 * | 1/2002 | Handleman | 363/95 |

(Continued)

FOREIGN PATENT DOCUMENTS

EP    0 427 143 A2    5/1991

(Continued)

OTHER PUBLICATIONS

Applebaum, J., "The Quality of Load Matching in a Direct-Coupling Photovoltaic System," *IEEE Transactions on Energy Conversions* EC-2(4):534-541, Dec. 1987.

(Continued)

*Primary Examiner*—Adolf Berhane
(74) *Attorney, Agent, or Firm*—Seed IP Law Group PLLC

(57) ABSTRACT

A power system employs an outer voltage feedback loop and an inner current feedback loop to control a power converter, such as a DC to AC inverter for transferring electrical power between a power source, for example a photovoltaic array, and a load, for example a power grid. The outer loop accommodates variations in the output of the power source, for example accommodating anomalies in IV characteristics such as IV droop characteristic associated with photovoltaic cells. The outer loop may employ a first control regime or a second control regime, for example, dependent on whether a DC bus voltage or power is smaller than a value corresponding to measurement resolution or expected noise.

24 Claims, 8 Drawing Sheets

U.S. PATENT DOCUMENTS

| | | | |
|---|---|---|---|
| 6,611,444 B1 * | 8/2003 | Ayyanar et al. | 363/132 |
| 2002/0034088 A1 | 3/2002 | Parkhill et al. | 363/144 |
| 2002/0118560 A1 | 8/2002 | Ahmed et al. | 363/144 |
| 2002/0167828 A1 | 11/2002 | Parkhill et al. | 363/144 |
| 2004/0264225 A1 * | 12/2004 | Bhavaraju et al. | 363/120 |
| 2005/0270806 A1 * | 12/2005 | Zhu | 363/17 |
| 2005/0281067 A1 * | 12/2005 | Deng et al. | 363/131 |

FOREIGN PATENT DOCUMENTS

| | | |
|---|---|---|
| EP | 0 578 108 A1 | 1/1994 |
| EP | 0 947 905 A2 | 10/1999 |
| EP | 1 271 742 A2 | 1/2003 |

OTHER PUBLICATIONS

Braunstein, A., et al., "On the Dynamic Optimal Coupling of a Solar Cell Array to a Load and Storage Batteries," *IEEE Transactions on Power Apparatus and Systems PAS-100*(3):1183-1187, Mar. 1981.

Hussein, K., et al., "Maximum Photovoltaic Power Tracking: An Algorithm for Rapidly Changing Atomospheric Conditions," *IEE Proc.-Gener. Transm. Distrib. 142*(1):59-64, Jan. 1995.

Kislovski, A., et al., "Maximum-Power-Tracking Using Positive Feedback," in *Proceedings of the IEEE Power Electron. Spec. Conference*, 1994, pp. 1065-1068.

U.S. Appl. No. 60/467,332, filed May 2, 2003, Deng et al.

U.S. Appl. No. 60/470,321, filed May 12, 2003, Deng et al.

Mohan et al., *Power Electronics: Converters, Applications and Designs*, John Wiley & Sons Inc., USA, 1989, Chapter 26-8, "Circuit Layout," p. 654.

Nafeh, A., et al., "Microprocessor Control System for Maximum Power Operation of PV Arrays," *Intl. Journal of Num. Model. 12*:187-195, 1999.

Sugimoto, H., et al., "A New Scheme for Maximum Photovoltaic Power Tracking Control," in *Proceedings of the Power Conversion Conference*, Nagaoka, 1997, vol. 2, pp. 691-696.

Tse, K., et al., "A Novel Maximum Power Point Tracker for PV Panels Using Switching Frequency Modulation," *IEEE Transactions on Power Electronics 17*(6):980-989, Nov. 2002.

Wolf, S., et al., "Economical, PV Maximum Power Point Tracking Regulator with Simplistic Controller," in *Proceedings of the IEEE Electron. Spec. Conference*, 1993, pp. 581-587.

* cited by examiner

METHOD AND APPARATUS FOR TRACKING MAXIMUM POWER POINT FOR INVERTERS, FOR EXAMPLE, IN PHOTOVOLTAIC APPLICATIONS

BACKGROUND OF THE INVENTION

1. Field of the Invention

This disclosure is generally related to power inverters, and particularly to inverters that invert power from photovoltaic sources.

2. Description of the Related Art

A photovoltaic cell is one of the cleanest and environment-friendly non-conventional energy sources. A photovoltaic cell directly converts solar energy into electrical energy. The electrical energy produced by the photovoltaic cell can be extracted over time and used in the form of electric power. This electric power can be used to drive electric devices. Typically the power is extracted by use of DC-DC up/down converter circuitry and/or DC/AC inverter circuitry.

The popularity of photovoltaic energy generation is rapidly increasing worldwide. One reason for such popularity is that the energy produced by photovoltaic energy generation is essentially pollution free, unlike conventional energy sources such as fossil fuel burning thermal power plants, nuclear reactors, and hydroelectric plants which all raise environmental issues. However, there are difficulties encountered with photovoltaic energy generation which are not present in conventional energy generation systems. These issues include the peculiar IV droop characteristics of photovoltaic cells, the cost, and the relatively low energy density (efficiency) of photovoltaic cells.

FIG. 1A is a graph of P-V curves for various P-V characteristics illustrating a unique difficulty associated with photovoltaic energy generation. Specifically, FIG. 1A shows the Power-Voltage (Power extracted versus Voltage) characteristics of different types of photovoltaic cells. The peculiar IV droop characteristics of photovoltaic cell arrays cause the output power to change nonlinearly with the current drawn from photovoltaic cells. It is clear from the curves that all types of photovoltaic arrays show nonlinear Power-Voltage curves. Furthermore, beyond the fact that the Power-Voltage curves are different for different types of photovoltaic arrays, the Power-Voltage curve changes for different radiation levels and temperatures of operation for any given photovoltaic array.

FIG. 2A is a graph of P-V curves for a single panel of photovoltaic cells operating at different ambient temperatures of 25, 50, and 75 degrees Centigrade. As noted above, the Power-Voltage curves for the same photovoltaic array are different at different temperatures. The near optimal point at which to operate photovoltaic arrays is at or near the region of the Power-Voltage curves where the Power is greatest. This point is denominated as the Maximum Power Point (MPP). It is difficult to track this MPP because the MPP differs across different types of arrays (such as shown in FIG. 1), differs for the same array based on different temperatures (such as was shown in FIG. 2A), and also differs for the same array based on the amount of radiation to which the array is exposed as shown for the curves of the amorphous photovoltaic cells in FIGS. 1A and 1B (e.g., a sunny versus a cloudy day). Consequently, a need exists for a method and system which will track and/or adjust to the MPP in response to variations of the operating conditions and also to the differences in photovoltaic arrays.

Photovoltaic cells are still relatively expensive and it's energy conversion efficiency is still relatively low so a wide area is required to generate sizable power. Hence it is important to operate the photovoltaic cells around the maximum power point to enhance the utilization of photovoltaic cells.

Various methods have been proposed, such as curve fitting techniques, incremental conductance estimation techniques, power matching schemes, Power Voltage slope detection, and using switching frequency modulation.

The power matching technique works well only when the characteristics of the solar panel can be matched with the load characteristics. The power matching technique only approximates the location of the specific radiation level and load conditions. The curve-fitting techniques require prior examination of the solar panel characteristics, so that an explicit mathematical function for describing the output characteristics is formulated. Although this technique attempts to track the MPP without explicitly computing the voltage-current product for the panel power, the curve-fitting technique cannot predict many characteristics including other complex factors, such as aging, temperature, and a possible breakdown of individual cells.

Power-Voltage slope detection techniques need very clean information regarding voltage and power change. This requires a very slow filter in the power calculation and voltage measurements which may detrimentally limit the response time. Thus, a rapid change in isolation level may cause problems in systems employing such techniques.

The switching frequency modulation technique requires a converter between the load and the solar cell, which is switched with a variable frequency to match the resistance with the panel resistance. Consequently, such an approach is not cost effective.

BRIEF SUMMARY OF THE DISCLOSURE

In one aspect, a method of operating a power system comprises in an outer voltage feedback loop, determining a DC voltage reference value based at least in part on at least one operational characteristic of the photovoltaic source; and determining a current reference value at least in part on an error between the determined DC voltage reference value and a DC voltage value indicative of a voltage across the DC bus; and in an inner current feedback loop, determining a current command value based at least in part on the error of the determined current reference value and a current value indicative of a current through the load; and producing control signals for controlling the inverter based at least in part on the determined current command value. The method may employ two different control regimes. In one control regime, the method increases the DC voltage reference value if a change in the DC voltage value and a change in a power produced by the photovoltaic source are both increasing or both decreasing; and decreases the DC voltage reference value if one of the change in the DC voltage value and the change in the power produced by the photovoltaic source is increasing and the other of the change in the DC voltage value and the change in the power produced by the photovoltaic source is decreasing. In the other control regime, the method maintains a sign of a voltage adjustment value, if an absolute value of a change in power is greater than a power error threshold; changes the sign of a voltage adjustment value, if a change in power is not greater than zero; maintains the sign of a voltage adjustment value, if a change in power is greater than a threshold change in power; and sets the DC voltage reference value equal to a sum of the voltage adjustment value and a previous value of the DC voltage reference value.

In another aspect, a power system comprises a switch mode inverter; a photovoltaic source electrically couplable to the inverter via a DC bus; and a control system communicatively coupled to supply control signals to the inverter means for determining an occurrence of a change in voltage of a photovoltaic source, the control system comprising: an outer voltage feedback loop, the outer voltage feedback loop comprising: means for determining a DC voltage reference value based at least in part on at least one operational characteristic of the photovoltaic source; and means for determining a current reference value at least in part on a sum of the determined DC voltage reference value and a DC voltage value indicative of a voltage across the DC bus; and an inner current feedback loop, the inner voltage feed back loop comprising: means for determining a current command value based at least in part of a sum of the determined current reference value and a current value indicative of a current through the load; and means for producing control signals for controlling the inverter based at least in part on the determined current command value.

In a further aspect, a method of operating a power system comprises monitoring a trend in power available from a power source; determining whether a change in the trend in power available from the power source is increasing or deceasing; changing a sign of a voltage adjustment value in response to determining that the change in the trend in power available from the power source is decreasing; determining a new voltage reference value based at least in part on the voltage adjustment value and a previous voltage reference value; and determining a current command to drive a power converter coupled to transform power from the power source based at least in part on the new voltage reference value.

In still a further aspect, a method of operating a power system comprises monitoring a power available from a power source; monitoring a power available from a power source; increasing a DC voltage reference value if a change in the power and the voltage available from the power source value are both increasing or both decreasing; decreasing the DC voltage reference value if one of the change in the power and the voltage available from the power source is increasing and the other of the change in the power and the voltage available from the power source is decreasing; determining a current reference value in a feedback loop based at least in part on the voltage reference value and the voltage available from the power source; and determining a current command to drive a power converter coupled to transform power from the power source based at least in part on the current reference value.

The methods can be combined to form a combination method, as described below.

DETAILED DESCRIPTION

In the following description, certain specific details are set forth in order to provide a thorough understanding of the various embodiments of the invention. However, one skilled in the art will understand that the invention may be practiced without these details. In other instances, well-known structures associated with photovoltaic arrays, inverters and processors or controllers have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Further more, the particular features, structures, or characteristics may be combined in any suitable manner in one or more embodiments.

The headings provided herein are for convenience only and do not interpret the scope or meaning of the claimed invention.

The use of the same reference numbers in different drawings typically indicate similar or identical items.

Described herein is a new technique which, in one embodiment, does not utilize any additional hardware interface between a photovoltaic array and a DC bus. This embodiment may be completely implemented in software, hence is very flexible and cost effective.

Figure 1B:
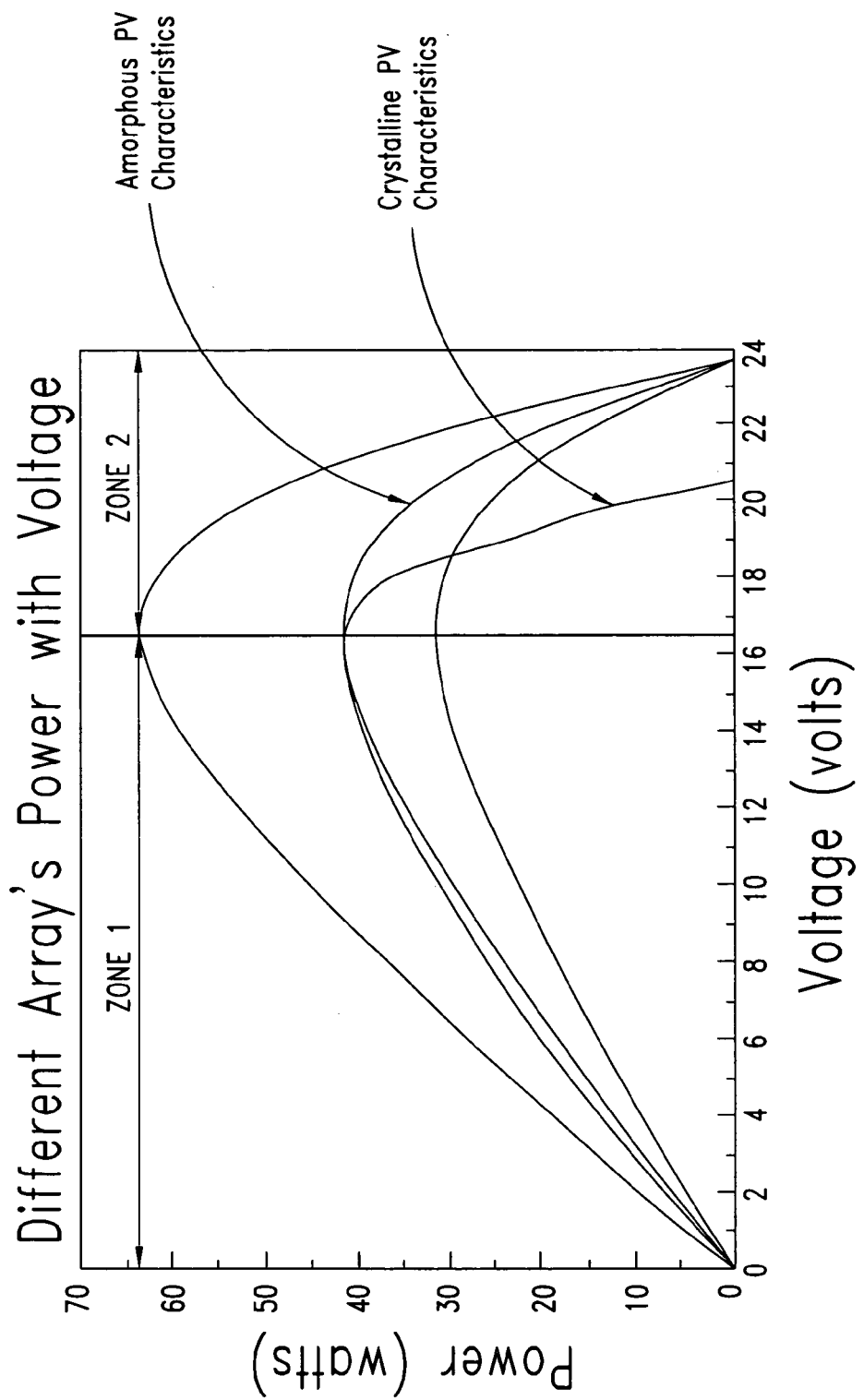
FIG. 1B is a graph of power versus voltage curves similar to that of FIG. 1A, and Zone 1 and Zone 2 wherein embodiments of the disclosed subject matter.
Figure 2A:
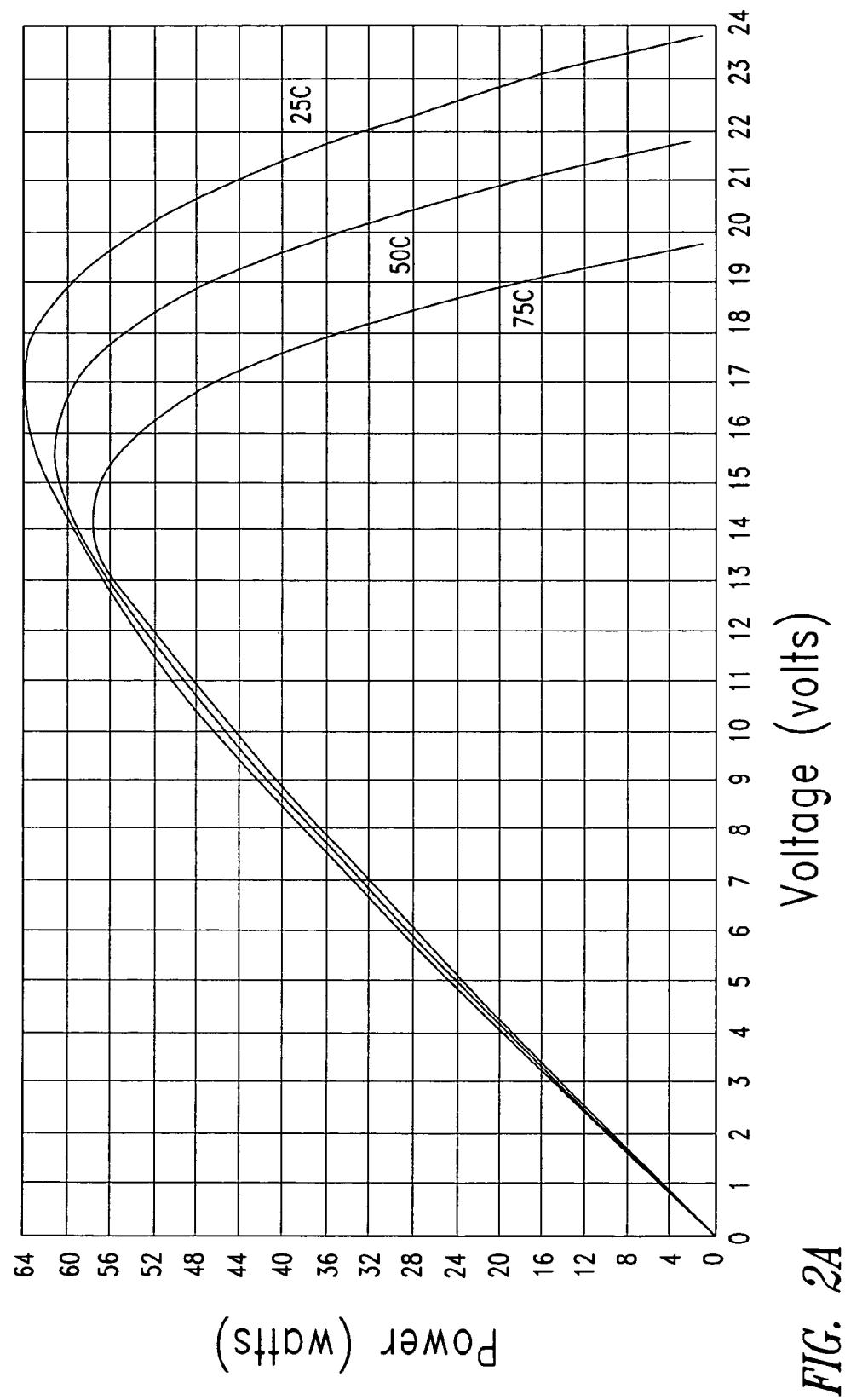
FIG. 2A is a graph of power versus voltage curves for a single panel of photovoltaic cells operating at different ambient temperatures of 25, 50, and 75 degrees Centigrade.
Figure 2B:
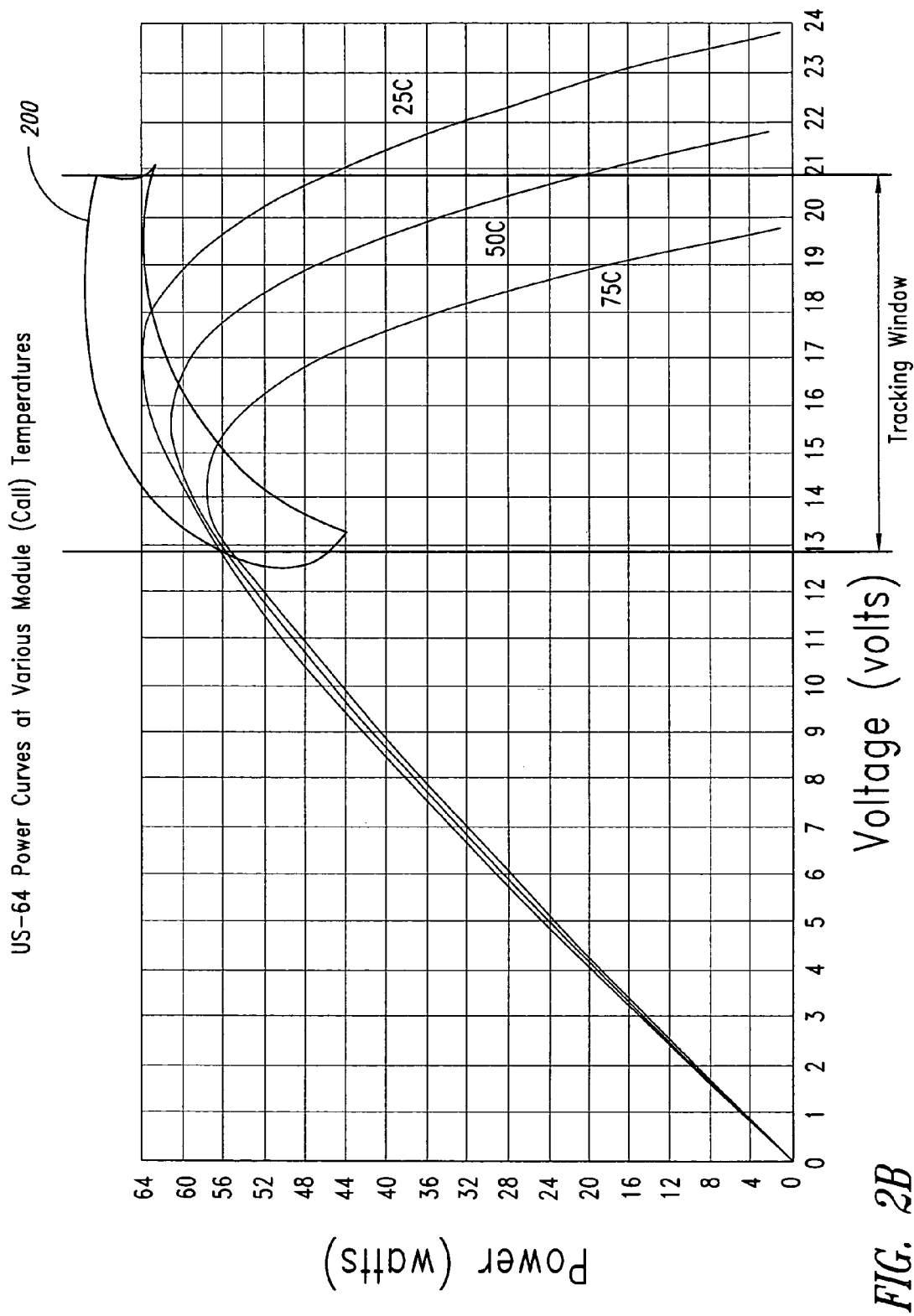
FIG. 2B is a graph of power versus voltage curves similar to that of FIG. 2A, and illustrating a tracking window which may define a region in which Maximum Power Point Tracking (MPPT) techniques described herein may actively control an inverter.

FIG. 2B shows the same curves as FIG. 2A, but further shows a tracking window which may be used to define a region 200 in which what will be referred to herein as the Maximum Power Point Tracking (MPPT) technique may actively control an inverter to extract maximum power from the photovoltaic array. Region 200 is such that it substantially encompasses the maximum power point (MPP). Although in one embodiment, the MPPT techniques are used in region 200, it is to be understood that in other contemplated embodiments the MPPT techniques are used in both Zone 1 and Zone 2 illustrated in FIG. 1B.

Figure 3:
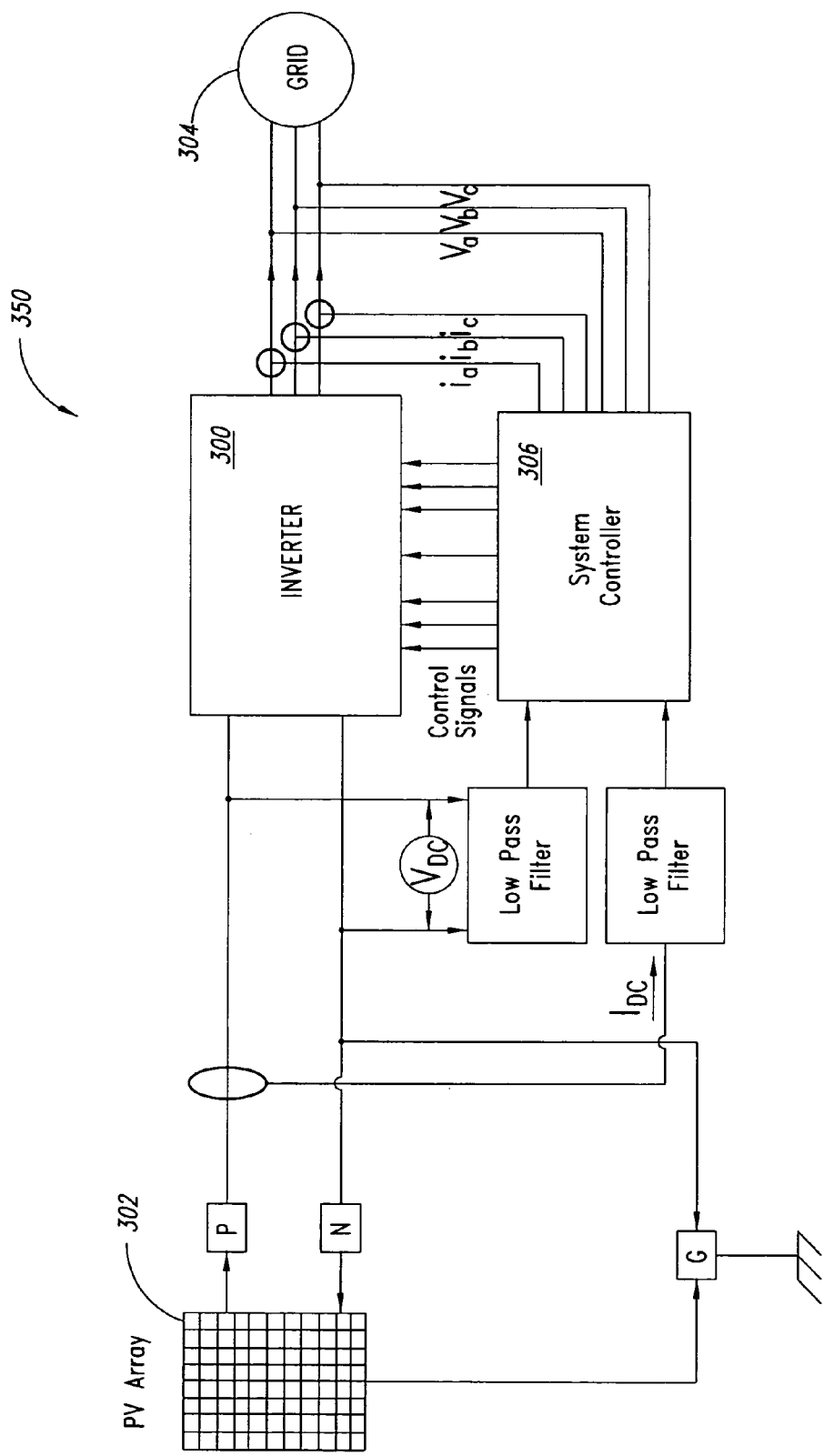
FIG. 3 is a schematic diagram of a system wherein MPPT techniques are implemented via a system controller, according to one illustrated embodiment.

FIG. 3 shows a system wherein the MPPT techniques described herein are implemented. A grid-link inverter 300 contains circuitry and/or logic appropriate to extract DC power from a photovoltaic array 302, invert the extracted power to AC power, and export the AC power to an AC power grid 304.

In one embodiment, the grid-link inverter 300 shown in FIG. 3 is a voltage source inverter working in current control mode. If it were possible to know, with certainty, the available power from the photovoltaic array 302, it would be possible to calculate the current command for the grid-link inverter 300 by using the power and the grid voltage information. However, as was explained above with reference to FIGS. 1 and 2A, due to variations between different types of photovoltaic arrays 302, as well as temperature and extraction-dependent variations within the same photovoltaic array 302, available power from photovoltaic array 302 is not generally known.

In one embodiment, the MPPT techniques do not employ any additional hardware interface between the photovoltaic array 302 and the DC bus. That is, in one embodiment the MPPT techniques are completely implemented in software executed by a system controller 306. This software embodiment is very flexible and cost effective.

One method of control is for the system controller 306 to increase the grid-link inverter 300 current command gradually until the power starts to decrease. However, the inventors have found that the ever-changing isolation level and temperature causes this method to be impractical. The inventors have also determined that the sharp knee in the IV characteristics (see FIGS. 1, 2A, and 2B) can potentially cause stability problems. The inventors have found that if the grid-link inverter 300 extracts more power from the photovoltaic array 302 than is available, the DC bus voltage will rapidly collapse, causing oscillations. The MPPT techniques taught herein may avoid this as well as other problems.

Figure 4:
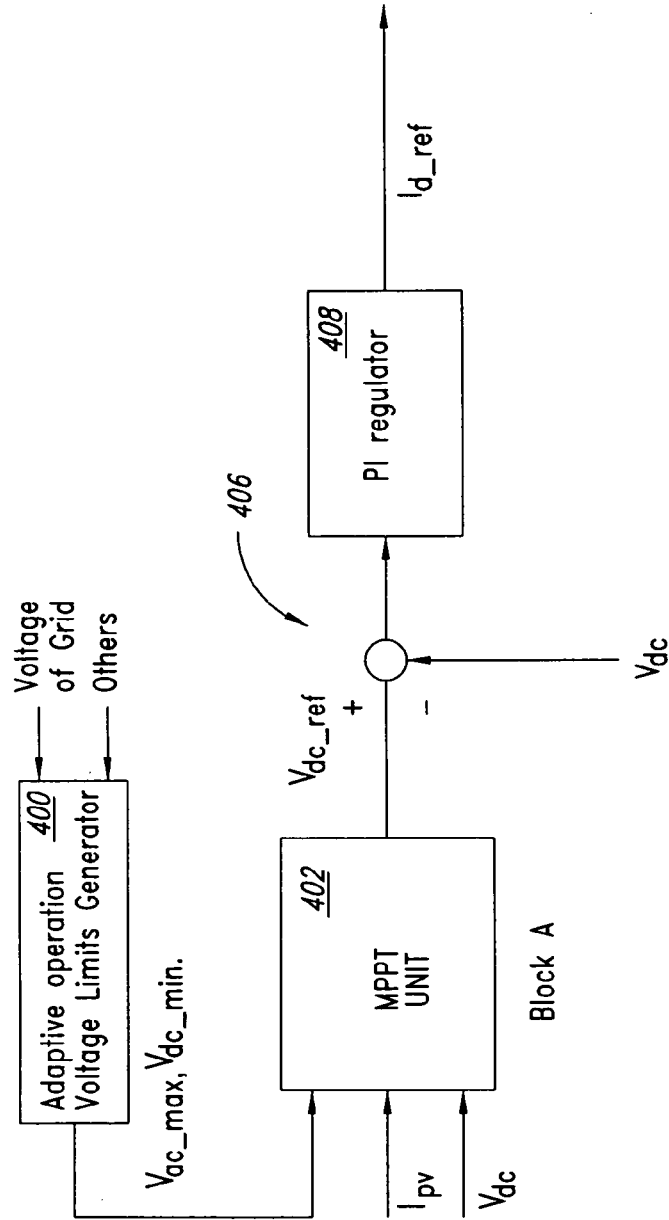
FIG. 4 is a block diagram of a system controller DC voltage feedback loop capable of executing certain of MPPT techniques described herein according to one illustrated embodiment.

FIG. 4 shows a DC voltage feedback loop that implements the MPPT techniques disclosed herein. The MPPT unit 402 provides a DC voltage reference $V_{dc\_ref}$ that is based on the MPPT techniques. As explained herein, an adaptation unit 400 receives inputs indicative of the voltage of the AC power grid 304 and/or voltages of other loads. In one embodiment, the adaptation unit 400 employs an adaptive voltage limiting operation. The adaptation unit 400 provides output signals indicative of an AC voltage maximum $V_{ac\_max}$, allowed DC voltage maximum $V_{dc\_max}$ and minimum $V_{dc\_min}$ to the MPPT unit 402. When the DC voltage $V_{dc}$ is greater than the DC voltage maximum $V_{dc\_max}$, the system will stop running to protect overvoltage operations. When the DC voltage $V_{dc}$ is less than or equal $V_{dc\_min}$, the system will stop MPPT operation, but keep the DC voltage $V_{dc}$ equal to the DC voltage minimum $V_{dc\_min}$ and deliver whatever power is available from the photovoltaic array 302 to the power grid 304.

The MPPT unit 402 receives input signals representative of the AC voltage maximum $V_{ac\_max}$, allowed DC voltage minimum $V_{dc\_min}$, as well as photovoltaic current $I_{pv}$, and and DC voltage $V_{dc}$. The MPPT unit 402 applies an embodiment of the MPPT techniques described herein to the input signals. The MPPT produces as an output a signal indicative of the DC voltage reference $V_{dc\_ref}$ and provides the DC voltage reference $V_{dc\_ref}$ to a summing junction 406.

The summing junction 406 receives input signals representative of the DC voltage reference $V_{dc\_ref}$ and DC voltage $V_{dc}$. The summing junction 406 generates an output signal based on a difference between DC voltage reference $V_{dc\_ref}$ and the DC voltage $V_{dc}$. The summing junction 406 provides the generated output signal to a PI (proportional integral) regulator 408. The PI regulator 408 generates a current reference output signal suitable for use in controlling operation of the inverter 300.

In various embodiments, the MPPT techniques disclosed here use new control structures, which in one embodiment employ an outer DC voltage feedback loop to generate a current command. These new control structures advantageously enhance the stability of the DC bus voltage $V_{cc}$. In one embodiment, the control structure employs the MPPT techniques to change the voltage reference command of this outer DC voltage feedback loop and to avoid the DC bus voltage collapsing (i.e., do not allow $V_{dc} < V_{dc\_min}$).

The outer DC voltage feedback loop regulates DC bus voltage to the DC value commanded by the MPPT method and system. If this voltage is lower than the photovoltaic array voltage, the inverter 300 will start exporting power to the grid 304 to lower the voltage. As it does so, the current from the photovoltaic array 302 increases. Hence the photovoltaic array voltage drops. In response, the MPPT method and system further reduces the command. This causes the photovoltaic array current to increase and DC bus voltage to decrease. The MPPT method and system continues to monitor the trend in power change. When a reversal in the trend in power change is detected, the sign of DC voltage reference change is reversed. This method and system works exceptionally well when the isolation level or temperature are fairly steady. However, when the temperature or the isolation level is dynamically changing, the tracking will not be as optimal. To remedy this, the actual change in DC voltage is also taken into account. Combining the information from the change in voltage and power, a right (or correct) decision for the direction of DC voltage reference change can be made. The following truth table explains the decision making process for this method and system.

Table 1 shows a truth table that illustrates one embodiment of the MPPT techniques:

TABLE 1

MPPT TRUTH TABLE.

| Change in Voltage | Change in Power | Action required |
|---|---|---|
| + | + | Increase $V_{dc\_ref}$ |
| + | − | Decrease $V_{dc\_ref}$ |
| − | + | Decrease $V_{dc\_ref}$ |
| − | − | Increase $V_{dc\_ref}$ |

In an alternate embodiment, the voltage controller also has an adaptive voltage limits generator that is used to widen an operational voltage range of the photovoltaic array 302. For example, the AC grid voltage is an input control variable. During day time, particularly when the load on the grid is heavier, the AC grid voltage will be lower, and the adaptive voltage limit ($V_{dc\_min}$) will be set to be lower such that it meets the photovoltaic array power delivery requirement to grid voltage. In this way the system will have wider operational voltage range.

Figure 5:
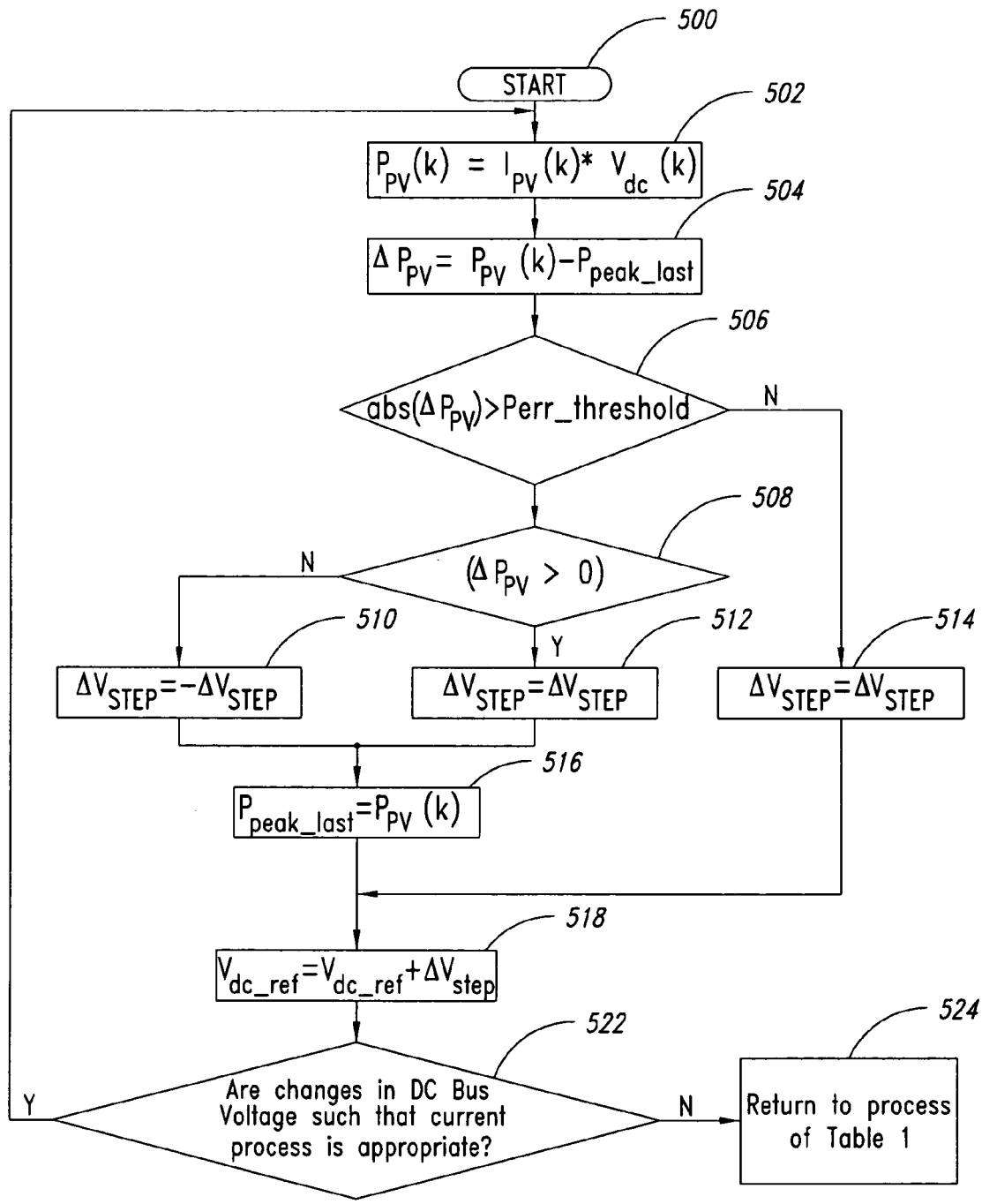
FIG. 5 depicts an MPPT control process that uses the DC bus voltage and DC current to calculate the DC power obtained from a photovoltaic array according to one illustrated embodiment.

The foregoing approach works exceptionally well in many instances, such as when the change in DC voltage is within measurement resolution. However, when the change in DC voltage becomes very small, the noise on the DC voltage could make the foregoing approach less effective. Accordingly, in another embodiment a method and system keep track of the amplitude of the voltage change and switches between the process described in the above truth table and another robust process. FIG. 5 shows one embodiment of this alternate process.

FIG. 5 depicts an MPPT control process that uses the DC bus voltage $V_{DC}$ and DC current $I_{PV}$ to calculate the DC power $P_{PV}$ obtained from the photovoltaic array 302. In FIG. 5, a robust process of keeping track of the power change trend has been employed which ensures that the power will tend toward maximization. The process starts at 500. At 502, the MPPT unit 400 calculates, for the kth sample, the power drawn from the photovoltaic array $P_{PV}(k)$, by multiplying the current drawn from the photovoltaic array $I_{PV}(k)$ by the DC bus voltage $V_{dc}(k)$. Thereafter, at 504, the MPPT unit 400 calculates the change in the power drawn from the photovoltaic array, $\Delta P_{PV}$, by taking a difference between the currently calculated power drawn from the photovoltaic array $P_{PV}(k)$, and the last calculated and/or measured peak power drawn from the photovoltaic array $P_{peak\_last}$.

At 506, the MPPT unit 400 determines whether the absolute value of the change in power drawn from the photovoltaic array, $abs(\Delta P_{PV})$, is greater than an error threshold $P_{err\_threshold}$. If the absolute value of the change in power drawn from the photovoltaic array $abs(\Delta P_{PV})$, is NOT greater than the defined error threshold $P_{err\_threshold}$, then at 514 the variable representing a stepwise change in voltage $\Delta V_{STEP}$, is set equal to the current value stored in $\Delta V_{STEP}$.

If the absolute value of the change in power drawn from the photovoltaic array, $abs(\Delta P_{PV})$, is greater than the error threshold, $P_{err\_threshold}$, at 508 the MPPT unit 400 determines whether the change in power drawn from the photovoltaic array $\Delta P_{PV}$, is greater than zero (0). If the change in power drawn from the photovoltaic array $\Delta P_{PV}$, is NOT greater than zero (0), at 510 the variable representing the stepwise change in voltage $\Delta V_{STEP}$, is set equal to $-\Delta V_{STEP}$, or the negative of the value currently stored in $\Delta V_{STEP}$. If the change in power drawn from the photovoltaic array is greater than zero (0), at 512 the variable representing the stepwise change in voltage $\Delta V_{STEP}$, is set equal to the value currently stored in $\Delta V_{STEP}$.

At 516 $P_{peak\_last}$ is set equal to the value of $P_{PV}(k)$. At 518 the DC voltage reference $V_{dc\_ref}$ is set equal to the value currently stored in $V_{dc\_ref}$ plus the value currently stored in $\Delta V_{STEP}$. Thereafter at 522, if the changes in DC bus voltage are such that the process of FIG. 5 is still appropriate (e.g., the DC bus voltage change and/or the power change from power source is still smaller than the set threshold values) the process returns to 502 and continues from that point as described previously. Otherwise, at 524 the process returns to the process illustrated and described in relation to Table 1, above. (The threshold values are related to measurement resolution and/or expected noise.)

In one embodiment, the DC voltage reference $V_{dc\_ref}$ command from the MPPT unit 400 will be impressed on the outer voltage loop. One implementation of a control diagram of such a voltage loop has been shown in FIG. 4.

In one embodiment, the DC voltage control loop generates a current command $I_{d\_ref}$ for an inner current loop.

Figure 6:
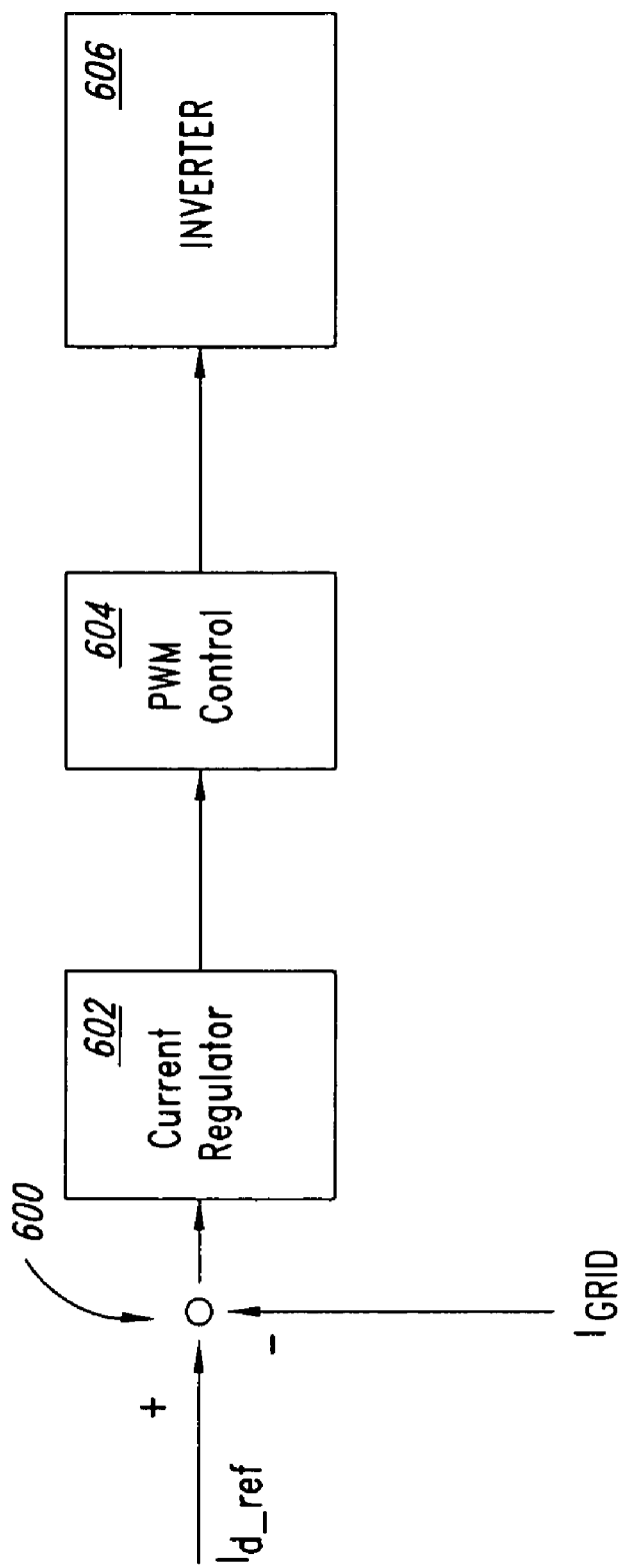
FIG. 6 shows an inner current feedback loop according to one illustrated embodiment.

FIG. 6 shows an embodiment of an inner current feedback loop. Junction 600 receives inputs of the current reference for the grid inverter 300 and a sensed current (e.g., a current being drawn). Junction 600 generates an output based on a difference between the current reference for the grid inverter and the sensed current. Junction 600 transmits its output to current regulator 602. Current regulator 602 receives the output of junction 602, and in response thereto, transmits the appropriate control signals to PWM (Pulse Width Modulated) controller 604. In one embodiment, the current regulator 602 will generate control signals sufficient to put the power to the grid at a desired power factor angle. PWM controller 602 receives the output of current regulator 602 and generates a PWM output signal. PWM controller 602 transmits the PWM output signal to the inverter 606.

The disclosed processes and devices may yield several advantages. For example, in various embodiments, the MPPT processes and/or devices are implemented in software hence it is cost effective, increases reliability of the system as component count reduces. It is not affected by aging and other unit-to-unit tolerance problems; in various embodiments, the MPPT processes and/or devices take into account actual voltage and power change, which ensure that the substantially maximum power is tracked even when the isolation level is changing; in various embodiments, the MPPT processes and/or devices have self-adjusting features as the substantially maximum power point is approached. The step size of the $V_{dc\_ref}$ change is dynamically changed as a function of the power error; in various embodiments, the MPPT processes and/or devices over come noise problems by introducing a threshold in power and logic to track the trend in power until the threshold is reached. This provides noise immunity while also providing trend in the power change to determine a direction for the next change in $V_{dc\_ref}$; in various embodiments, the MPPT processes and/or devices are independent of the array type, isolation level, and ambient temperature. The combination and method can provide both fast response and noise immunity for MPPT control.

Figure 1A:
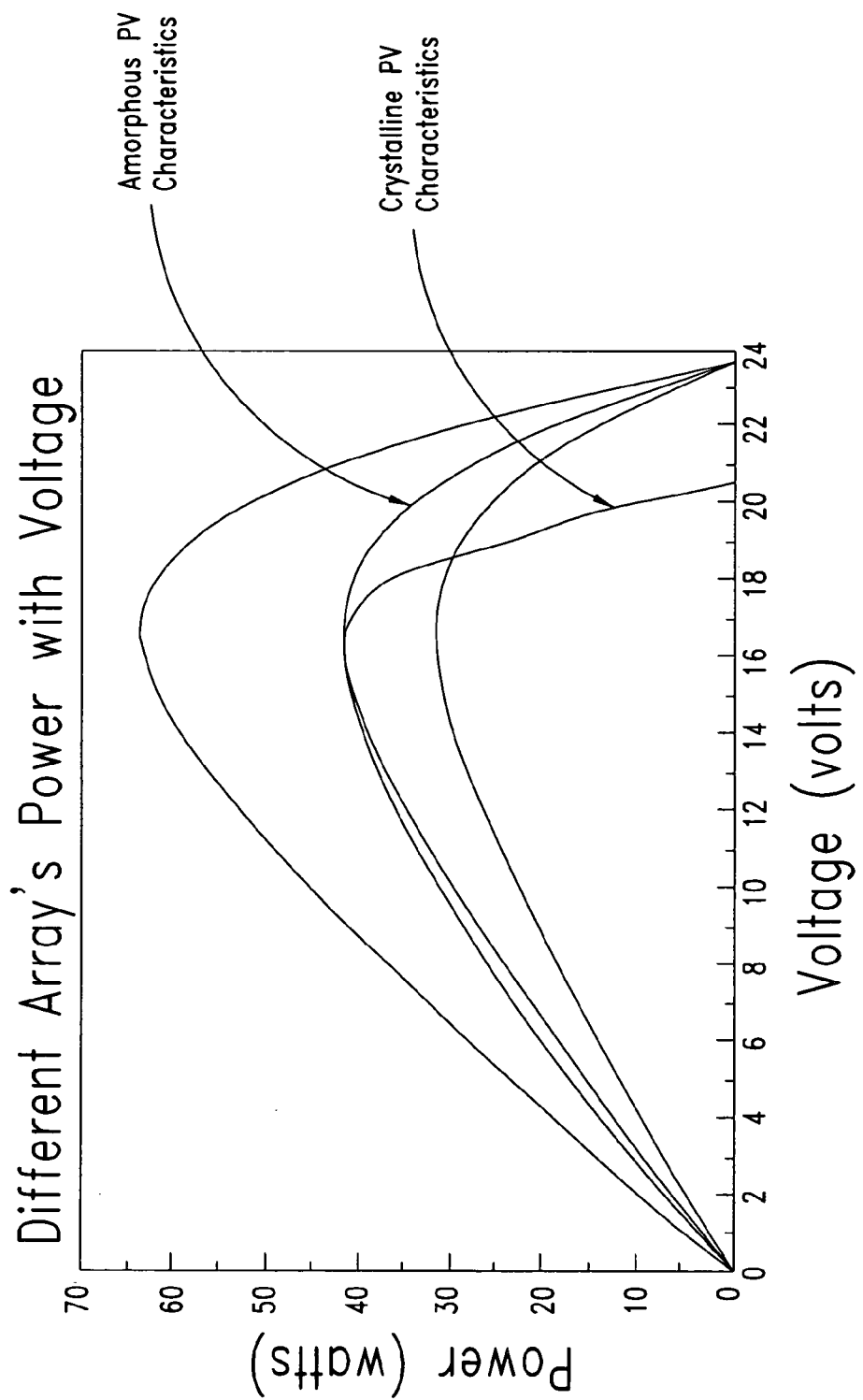
FIG. 1A is a graph of power versus voltage curves for a number of different photovoltaic cells, illustrating the non-linear aspect of such.

Also for example, in various embodiments, the MPPT processes and/or devices have a photovoltaic array voltage control based MPPT control method for 3 phases AC power generation system. This technique can also be used for DC, single phase AC or other multi phases AC power generation systems. Certain advantages of this method may include:

(a) The photovoltaic array bus voltage will not tend to collapse even if photovoltaic array operates in the zone of FIG. 1 with negative slope of I/V. MPPT operation prefers the photovoltaic array to operate in this area.

(b) This method guarantees stable operation for possible wide operation voltage range under variety of conditions such as different isolation levels, ambient temperature variations, grid voltage changes, aging, shifting shadow, partial cell failure, etc., that create the wider photovoltaic array operation voltage range.

The adaptive minimum photovoltaic array operation voltage settings in various embodiments of the MPPT processes and/or devices are based on grid voltage level that effectively guaranty the photovoltaic array-converter power source will tend to meet grid operation voltage requirements. During the day time, particularly sunny hot hours, the grid usually has a heavier load and the grid voltage will be lower, the photovoltaic array's voltage is lower, however, the adaptive minimum DC bus voltage setting value is also adjusted to a lower value that widens the operation voltage range for the photovoltaic array.

In various embodiments, the MPPT processes and/or devices have control methods based on an actual photovoltaic array's output voltage, current, and power. In various embodiments, the MPPT processes and/or devices' tracking will be obtained under a variety of variations such as isolation, ambient temperature, grid voltage changes, aging, shadow, partial cell failure, cleanness of photovoltaic array's surface, etc. In various embodiments, the MPPT processes and/or devices are virtually independent of the type of the solar array or the operating conditions.

In various embodiments, the MPPT processes and/or devices have methods of voltage reference generation with noise immunity that allow the system to track the substantially maximum power point with more accuracy. One reason this is true is because around the knee point power change will be small, but the voltage change can be large.

In various embodiments, the MPPT processes and/or devices have methods of combined voltage reference generation with noise immunity which tend to make the MPPT tracking speed faster. One reason that this is so is because larger voltage upgrading steps can be used when the operation point is not near the MPPT point, and adaptive voltage reference can be used when the operation point is near the MPPT point without noise interference.

In various embodiments, the MPPT processes and/or devices use of adaptive wake up voltage adjustment without a long term memory makes the system able to learn the correct wake up voltage faster (within a day). This also makes the inverter adaptable for fast changing weather.

Those having ordinary skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having ordinary skill in the art will appreciate that there are various vehicles by which aspects of processes and/or systems described herein can be effected (e.g., hardware, software, and/or firmware), and that the preferred vehicle will vary with the context in which the processes and/or systems are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which aspects of the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

The foregoing detailed description has set forth various embodiments of the devices and/or processes via the use of block diagrams, schematics, and examples. Insofar as such block diagrams, schematics and examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard Integrated Circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure. In addition, those skilled in the art will appreciate that the mechanisms of taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory; and transmission type media such as digital and analogue communication links using TDM or IP based communication links (e.g., packet links).

All of the above U.S. patents, U.S. patent application publications, U.S. patent applications, foreign patents, foreign patent applications and non-patent publications referred to in this specification and/or listed in the Application Data Sheet, including but not limited to U.S. Provisional Patent Application Ser. No. 60/467,332, entitled "MAXIMUM POWER POINT TRACKING TECHNIQUE FOR A GRID-LINK PHOTOVOLTAIC INVERTER," and filed May 2, 2003; U.S. Provisional Patent Application Ser. No. 60/470,323, entitled "METHOD AND APPARATUS FOR ADJUSTING WAKEUP TIME IN ELECTRICAL POWER CONVERTER SYSTEMS AND TRANSFORMER ISOLATION," and filed May 12, 2003; U.S. Provisional Patent Application Ser. No. 60/470,321, entitled "METHOD AND APPARATUS FOR TRACKING MAXIMUM POWER POINT FOR A GRID-LINKED PHOTOVOLTAIC INVERTER," and filed May 12, 2003; and U.S. patent application Ser. No. 10/836,212, entitled "METHOD AND APPARATUS FOR DETERMINING A MAXIMUM POWER POINT OF PHOTOVOLTAIC CELLS," and filed Apr. 30, 2004, are incorporated herein by reference, in their entirety.

The processes and devices disclosed herein can be used in with sources other than photovoltaic sources. For example, those systems which exhibit significant IV droop characteristics, or other anomalous IV behavior, analogous to that discussed herein.

From the foregoing it will be appreciated that, although specific embodiments have been described herein for purposes of illustration, various modifications may be made without deviating from the spirit and scope of the invention. Accordingly, the invention is not limited except as by the appended claims.

We claim:

1. A method of operating a power system comprising a switch mode inverter, a photovoltaic source electrically couplable to the inverter via a DC bus, a load electrically couplable to the inverter via an AC grid bus, and a controller communicatively coupled to supply control signals to the inverter, the method comprising:

in an outer voltage feedback loop,
   determining a DC voltage reference value based at least in part on at least one operational characteristic of the photovoltaic source; and
   determining a current reference value at least in part on a sum of the determined DC voltage reference value and a DC voltage value indicative of a voltage across the DC bus; and in an inner current feedback loop,
   determining a current command value based at least in part on a sum of the determined current reference value and a current value indicative of a current through the load; and
   producing control signals for controlling the inverter based at least in part on the determined current command value.

2. The method of claim 1 wherein the load is an electrical power grid, and further comprising:
   determining the current flowing through the electrical power grid.

3. The method of claim 1 wherein determining a current command value based at least in part of a sum of the determined current reference value and a load current value indicative of a current through the load comprises:
   summing the determined current reference value and a negative of the load current value.

4. The method of claim 1 wherein producing control signals for controlling the inverter comprises:
   regulating the current command value; and
   pulse width modulating the regulated current command value.

5. The method of claim 1 wherein determining a current reference value at least in part on a sum of the determined DC voltage reference value and a DC voltage value indicative of a voltage across the DC bus comprises:
   summing the DC reference voltage value and a negative of the DC voltage value; and
   proportionally integrating the sum of the DC reference voltage value and the negative of the DC voltage value.

6. The method of claim 1 wherein determining a DC voltage reference value based at least in part on at least one operational characteristic of the photovoltaic source comprises:
   determining which of two control regimes to apply based on a rapidity of change in at least one of the DC voltage across the DC bus and, or a DC power.

7. The method of claim 6 wherein the rapidity of change in the DC voltage and, or the DC power exceeds a threshold, and wherein determining the DC voltage reference value based at least in part on at least one operational characteristic of the photovoltaic source comprises:
   increasing the DC voltage reference value if a change in the DC voltage value and a change in a power produced by the photovoltaic source are both increasing or both decreasing; and
   decreasing the DC voltage reference value if one of the change in the DC voltage value and the change in the power produced by the photovoltaic source is increasing and the other of the change in the DC voltage value and the change in the power produced by the photovoltaic source is decreasing.

8. The method of claim 6 wherein the rapidity of change in the DC voltage and, or the DC power exceeds a threshold, and determining the DC voltage reference value based at least in part on at least one operational characteristic of the photovoltaic source comprises:
   increasing the DC voltage reference value if a change in the DC voltage value and a change in a power produced by the photovoltaic source are both increasing or both decreasing.

9. The method of claim 6 wherein the rapidity of change in the DC voltage and, or the DC power exceeds a threshold, and determining the DC voltage reference value based at least in part on at least one operational characteristic of the photovoltaic source comprises:
   decreasing the DC voltage reference value if one of a change in the DC voltage value and a change in a power produced by the photovoltaic source is increasing and the other of the change in the DC voltage value and the change in the power produced by the photovoltaic source is decreasing.

10. The method of claim 6 wherein when the rapidity of change in the DC voltage and, or the DC power does not exceed a threshold, and wherein determining the DC voltage reference value based at least in part on at least one operational characteristic of the photovoltaic source comprises:
    maintaining assign of a voltage adjustment value, if an absolute value of a change in power is greater than a power error threshold; and
    setting the DC voltage reference value equal to a sum of the voltage adjustment value and a previous value of the DC voltage reference value.

11. The method of claim 10 wherein when the rapidity of change in the DC voltage and, or the DC power does not exceed a threshold, and wherein determining the DC voltage reference value based at least in part on at least one operational characteristic of the photovoltaic source comprises:
    changing a sign of a voltage adjustment value, if a change in power is not greater than zero; and
    setting the DC voltage reference value equal to a sum of the voltage adjustment value and a previous value of the DC voltage reference value.

12. The method of claim 10 wherein when the rapidity of change in the DC voltage and, or the DC power does not exceeds a threshold, and wherein determining the DC voltage reference value based at least in part on at least one operational characteristic of the photovoltaic source comprises:
    maintaining a sign of a voltage adjustment value, if a change in power is greater than a threshold change in power; and
    setting the DC voltage reference value equal to a sum of the voltage adjustment value and a previous value of the DC voltage reference value.

13. A power system for supplying power to a load, comprising:
    a switch mode inverter, electrically couplable to the load via an AC grid bus;
    a photovoltaic source electrically couplable to the inverter via a DC bus; and
    a control system communicatively coupled to supply control signals to the inverter means for determining an occurrence of a change in voltage of a photovoltaic source, the control system comprising:
    an outer voltage feedback loop, the outer voltage feedback loop comprising:
       means for determining a DC voltage reference value based at least in part on at least one operational characteristic of the photovoltaic source; and
       means for determining a current reference value at least in part on a sum of the determined DC voltage reference value and a DC voltage value indicative of a voltage across the DC bus; and
    an inner voltage feedback loop, the inner voltage feed back loop comprising:
       means for determining a current command value based at least in part of a sum of the determined current reference value and a current value indicative of a current through the load; and
       means for producing control signals for controlling the inverter based at least in part on the determined current command value.

14. The power system of claim 13 wherein the means for determining a current command value based at least in part of a sum of the determined current reference value and a load current value indicative of a current through the load comprises:

means for summing the determined current reference value and a negative of the load current value.

15. The power system of claim 13 wherein the means for determining a current reference value at least in part on a sum of the determined DC voltage reference value and a DC voltage value indicative of a voltage across the DC bus comprises:

a summing junction coupled to sum the DC reference voltage value and a negative of the DC voltage value; and proportional/integral controller coupled to proportionally integrate the sum of the DC reference voltage value and the negative of the DC voltage value.

16. The power system of claim 13 wherein the means for determining a DC voltage reference value based at least in part on at least one operational characteristic of the photovoltaic source comprises:

means for determining which of two control regimes to apply based on a rapidity of change in the DC voltage across the DC bus and, or a DC power.

17. The power system of claim 16 wherein the means for determining the DC voltage reference value based at least in part on at least one operational characteristic of the photovoltaic source when the rapidity of change in the DC voltage exceeds a threshold comprises:

means for increasing the DC voltage reference value if a change in the DC voltage value and a change in a power are both increasing or both decreasing; and decreasing the DC voltage reference value if one of the change in the DC voltage value and the change in the power is increasing and the other of the change in the DC voltage value and the change in the power is decreasing.

18. The power system of claim 16 wherein the means for determining the DC voltage reference value based at least in part on at least one operational characteristic of the photovoltaic source when the rapidity of change in the DC voltage and, or the DC power does not exceed a threshold comprises:

means for maintaining a sign of a voltage adjustment value, if an absolute value of a change in power is greater than a power error threshold, changing a sign of a voltage adjustment value, if a change in power is not greater than zero, maintaining a sign of a voltage adjustment value, if a change in power is greater than a threshold change in power, and setting the DC voltage reference value equal to a sum of the voltage adjustment value and a previous value of the DC voltage reference value.

19. A method of operating a power system, the method comprising:

monitoring a trend in power available from a power source;

determining whether a change in the trend in power available from the power source is decreasing or increasing;

changing a sign of a voltage adjustment value in response to determining that the change in the trend in power available from the power source is decreasing;

determining a new voltage reference value based at least in part on the voltage adjustment value and a previous voltage reference value; and determining a current command to drive a power converter coupled to transform power from the power source based at least in part on the new voltage reference value.

20. The method of claim 19, further comprising:

summing the new voltage reference value with a power source voltage value indicative of a voltage across the power source; and proportionally integrating the sum of the new voltage reference value and the power source voltage value to produce a current reference value.

21. The method of claim 19, further comprising:

summing the current reference value with a load current value indicative of current through a load electrically coupled to the power converter.

22. A method of operating a power system, the method comprising:

monitoring a power available from a power source;

monitoring a voltage available from the power source;

increasing a DC voltage reference value if a change in the power and the voltage available from the power source value are both increasing or both decreasing;

decreasing the DC voltage reference value if one of the change in the power and the voltage available from the power source is increasing and the other of the change in the power and the voltage available from the power source is decreasing;

determining a current reference value in a feedback loop based at least in part on the voltage reference value and the voltage available from the power source; and determining a current command to drive a power converter coupled to transform power from the power source based at least in part on the current reference value.

23. The method of claim 22 wherein determining a current command to drive a power converter coupled to transform power from the power source based at least in part on the current reference value comprises:

summing the current reference value with a negative of a current draw by a load electrically coupled to the power converter;

regulating the resulting sum; and pulse width modulating the regulated sum to produce pulse width modulated control signals.

24. The method of claim 23 wherein the power source is a photovoltaic power source and the power converters is a switch mode inverter, and further comprising:

supplying the pulse width modulated control signals to the switch mode inverter for controlling the operation thereof to transform DC power from the power source into AC power for driving the load.

* * * * *